Figure 1:
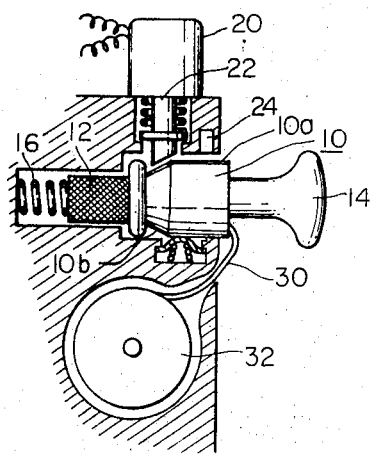

United States Patent [19]
Takeuchi

[11] 3,831,707
[45] Aug. 27, 1974

[54] SYSTEM TO PREVENT DRUNKEN DRIVING
[75] Inventor: Yasuhisa Takeuchi, Yokosuka, Japan
[73] Assignee: Nissan Motor Company, Limited, Yokosuka, Japan
[22] Filed: Aug. 13, 1973
[21] Appl. No.: 387,651

[52] U.S. Cl............. 180/99, 73/336, 73/344, 128/2 C, 307/10 R, 307/118, 340/279
[51] Int. Cl............................................. B60k 27/08
[58] Field of Search......... 180/99, 82 R, 82 A, 82.7, 180/96, 103; 340/52 R, 229, 237 R, 279; 73/23, 29, 336, 336.5, 344; 128/2 C, 2 H, 2.07, 2.08; 307/10 R, 118; 23/232 C, 232 E

[56] References Cited
UNITED STATES PATENTS
| | | | |
|---|---|---|---|
| 3,232,288 | 2/1966 | Krobath | 128/2.08 |
| 3,631,436 | 12/1971 | Taguchi | 340/237 R |
| 3,746,512 | 7/1973 | Kamei et al. | 23/232 E |
| 3,780,311 | 12/1973 | Brown | 128/2 C X |

*Primary Examiner*—Lloyd L. King
*Assistant Examiner*—Randolph A. Reese
*Attorney, Agent, or Firm*—Robert E. Burns; Emmanuel J. Lobato; Bruce L. Adams

[57] ABSTRACT

A device which tests a vehicle operator for drunkenness and prevents operation of the vehicle in response to a sensed drunken condition.

16 Claims, 2 Drawing Figures

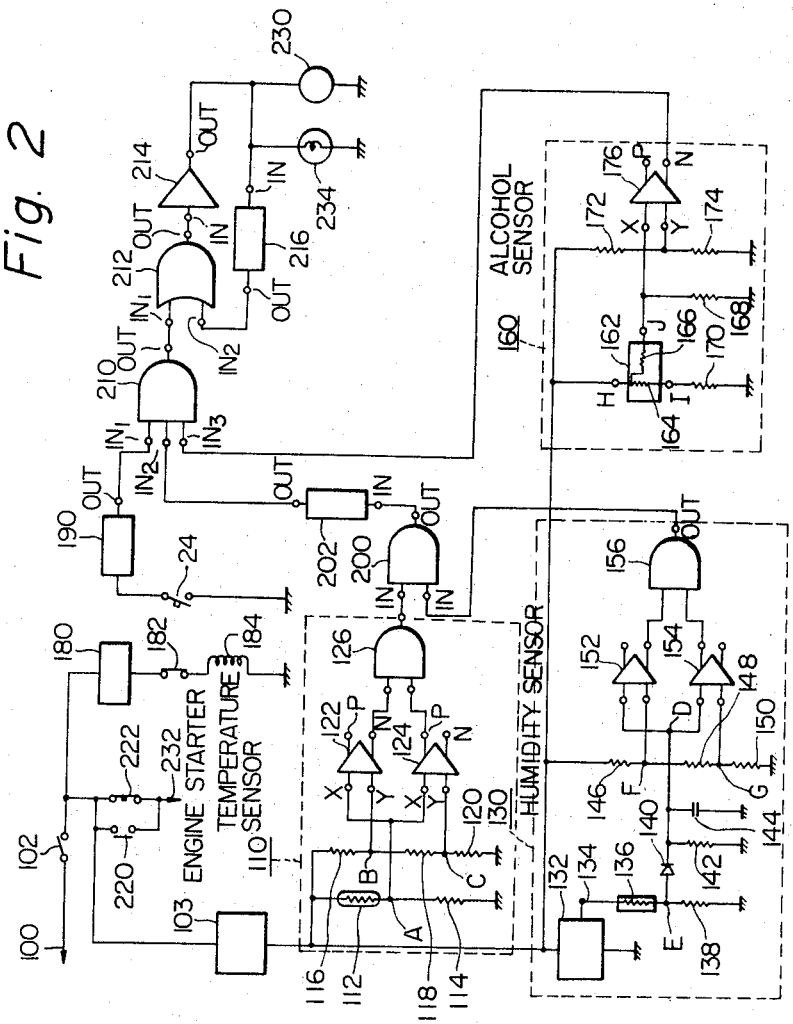

SYSTEM TO PREVENT DRUNKEN DRIVING

The present invention relates in general to a safety system for vehicles and in particular to a system for preventing highway, aircraft, and railway vehicles, machines and similar devices from being operated when their operators are in a drunken condition.

It is generally observed that, as a result of a concentration of 0.1 percent alcohol in human blood, mental abilities such as judgement, comprehension and reasoning decrease sharply. It is accordingly very dangerous to allow operators to drive vehicles when they are drunken to such an extent.

Heretofore there have been proposed methods and systems for inhibiting drunken operators from driving vehicles, wherein the operators have to take physiological tests of, for example, memory, visual acuity, time and accuracy in choice decision and others, and are permitted to drive their vehicles only when they have passed all these tests. However, the results of these physiological tests vary considerably between individual operators, even if they have drunk the same amount of alcohol. Also, the results of the tests depend on other physical and mental conditons to which the drunken operators were exposed before taking alcohol: for example, a drunken operator in a happy or healthy condition will perform better in the tests than a drunken operator in a bad condition.

These methods and systems, therefore, have been able to detect at best only about 50 percent of operators who have a 0.1 percent concentration of alcohol in their blood. Difficulty is encountered in that, if more rigorous tests are applied for the purpose of detecting more than 50 percent, a person who has not taken alcohol at all may be erroneously determined as in a drunken condition and prevented from driving. Thus, the known methods and systems have brought about only unsatisfactory results in that a half or more of drunken operators are left to drive cars and vehicles.

There is another proposed safety system which is arranged to detect the level of alcohol in the air within an occupant compartments of a vehicle during driving, and the engine is shut off when the detected level of alcohol reaches a predetermined value. The above described system is accompanied with the disadvantage that, whenever any vehicle occupant other than operator is drunken, the vehicle is unnecessarily deenergized.

It is therefore an object of the present invention to provide a safety system particularly for a motor vehicle which eliminates the aforementioned short-comings and drawbacks of conventional systems.

Another object is to provide a safety system which is designed to rapidly and effectively detect a major percentage of drunken operators, even where the amount of alcohol taken by them is relatively small.

Still another object is to dependably inhibit drunken operators from driving their vehicles unless they pass a test according the present invention.

Other objects are broad applicability to various industrial uses, reliability in operation and ability for slight modification particularly in consideration of the climatic condition in which the invention is employed.

Other objects, features and advantages of the present invention will be readily apparent from the succeeding description, reference being made to the accompanying drawings, wherein:

FIG. 1 is a view partly in section of a preferred embodiment of a safety system according to the present invention; and FIG. 2 is a circuit diagram of an electronic system employed in the embodiment of FIG. 1.

FIG. 1 generally illustrates a safety system disposed behind an instrument panel of a vehicle or any other suitable part, preferably near a driver's seat. The safety system comprises a sensor body or sensing assembly 10, having a cylindrical portion 10a and a conical portion 10b. To the end adjacent to the conical portion 10b is attached a housing 12 made of wire netting or other porous material, which houses therein a group of sensing elements (not shown) of temperature, humidity and alcohol, as will be later discussed. A knob 14 extends from the other end of the sensor body 10. The sensor body 10 is usually stored in a space (no numeral) provided behind a wall of the vehicle, while the knob 14 projects from the wall toward the driver's compartment to be gripped by the driver's hand. The sensor body 10 is biased outward by a spring 16 attached to the rear end of the housing 12. Designated by a numeral 20 is a solenoid assembly accommodating a solenoid coil to be later described which is operatviely connected through an ignition switch (102 in FIG. 2) to a power source (100 in FIG. 2). The solenoid assembly 20 is provided with a latch 22 which engages with the conical portion 10b of the sensor body 10 to lock the sensor body 10 in a stored or locked position as shown, as long as the solenoid device is deenergized. A spool drum 32 automatically winds thereon lead wires 30 for use with a circuit arrangement to be described later, when the sensor body 10 is in a stored position.

In operation, after a certain time elapses after closure of the ignition switch 102, the solenoid device 20 is energized in a manner to be fully described later. As a result, the latch 22 moves upward and away from the conical portion 10b, and therefore the sensor body 10 is moved forward by the action of the spring 16 and reaches an intermediate position at which the housing 12 is yet behind the wall of the vehicle. Once the intermediate position is reached however, the operator is able to withdraw the sensor body 10 using the knob 14. The operator then exhales against the housing 12 to detect whether he is drunken, as will be apparent from the succeeding description. At a suitable location adjacent to the sensor body 10, a position detector switch 24 is provided which indicates stored, intermediate and withdrawn positions of the sensor body 10. This switch 24 may be of any known type, but preferably is a micro switch or a lead relay switch.

The circuit arrangement constituting the most important part of the present invention will be described with reference to FIG. 2. The power source 100 is a source of d.c. voltage such as a battery. The ignition switch 102 is connected to the power source 100, and is closed to enable the test according to the present invention to be taken. A d.c. voltage regulator 103 supplies voltage to all circuits and elements as hereinafter described. The elements surrounded by a broken line 110 as a unit constitute a temperature sensor. A temperature sensing element 112 such as a thermistor is disposed in the housing 12 shown in FIG. 1 as described. Resistors 114 to 120 are arranged as illustrated. Indicated as 122 and 124 are a pair of voltage comparators which have X and Y inputs and P and N outputs. The comparators 122 and 124 are arranged so that when the voltage at X is higher than or equal to the voltage at Y, they produce a high voltage at their output P and a low voltage at their output N, while when the voltage at X is lower than that at Y, a low voltage signal results at P and a high voltage signal at N. The output N of the comparator 122 and the output P of the comparator 124 are shown as being connected to inputs of an AND circuit 126. The AND circuit 126 produces a high voltage output when the voltages at both of its inputs are higher than a predetermined level.

The temperature sensor 110 operates as follows; Assume that voltages at points A, B and C are respectively, $a$, $b$ and $c$, and that the voltage $a$ rises in proportion to the temperature sensed by the element 112. If the voltage $a$ is within a certain range, the temperature sensed by the element 112 also proves to be within a corresponding range. Thus, the comparator 122 compares the voltage $a$ with a reference voltage $b$ and when $$a - b < 0 \quad (1)$$

it produces a high voltage at the output N. The comparator 124 on the other hand, compares the voltage $a$ with another reference voltage $c$, and when $$a - c \geqq 0 \quad (2)$$

it produces a high voltage at the output P. Because of the arrangement of the resistors 114 to 120 as shown, $$b > c \quad (3)$$

If high voltages appear simultaneously at the output N of the comparator 122 and the output P of the comparator 124, the following relation is derived from (1), (2) and (3):

$$b > a \geqq c$$

In this instance, the AND circuit 126 produces a high voltage first signal at its output. It follows that a high voltage output from the AND circuit 126 demonstrates that the temperature at the element 112 and therefore the temperature of the operator's breath is within a certain range.

Enclosed by a broken line 130 is a humidity sensor. An a.c. voltage regulator 132 is employed which supplies a terminal 134 with regulated a.c. voltage. Designated by a numeral 136 is a humidity sensing element which is accommodated in the housing 12 of FIG. 1. A resistor 138 is connected between the humidity sensing element 136 and ground.

The element 136 may comprise a humidity sensing film coated on a suitable insulating material (not shown), the electrical resistance of the film varying with the ambient humidity. The humidity sensing film is appropriately made from an electrolytic material such as sulphuric acid, lithium chloride or calcium chloride or of a metallic oxide such as magnetite. Consequently, the conductivity of the element 136 increases as the humidity rises. Unlike the temperature sensor 110 a.c. voltage is used in order to prevent polarization of the humidity sensing film which would result in transformation of chemical properties of the humidity sensing film. The a.c. voltage resulting at a point E is proportional to the ambient humidity at the element 136. A diode 140, a resistor 142 and a capacitor 144 rectify the a.c. voltage at E to produce at D a d.c. voltage proportional to the a.c. voltage at E. Since the d.c. voltage at D is proportional to humidity at the element 136, if the voltage at D is within a certain range, the humidity of the operator's breath is also within a certain range. Comparators 152 and 154 and an AND circuit 156 are substantially similar in operation to those described in connection with the temperature sensor 110, and therefore a detailed explanation thereof is unnecessary. If the voltages at F and G are respectively $f$ and $g$ and the voltage at D is $d$, a high voltage second signal appears at the output of the AND circuit 156 when $f > d \geqq g$, if resistors 146, 148 and 150 are suitably selected, or, when the humidity of the operator's breath, i.e., the humidity at the element 136 is within a certain range.

Enclosed by a broken line 160 is an alcohol sensor. An alcohol sensing element 162, which is also accommodated in the housing 12 of FIG. 1, comprises a semiconductive metallic oxide material such as tin-dioxide, diiron trioxide, titanium dioxide or aluminium oxide. This semi-conductive material has a property such that when heated to a certain temperature, its electrical resistance sharply decreases as it absorbs ethyl alcohol. In the drawing, a resistor 164 is adapted to act as a heater to heat the sensing material, and a resistor 170 controls the current flowing through the resistor 164. The element 162, formed of the aforementioned sensing material, has a resistance which drops as the concentration of alcohol increases. It is apparent that the voltage at J increases in proportion to the concentration of alcohol in the operator's breath. A numeral 176 indicates a voltage comparator which produces a high voltage third signal at its output N, when $x-y < 0$, where $x$ and $y$ are respectively voltages at X and Y. The voltage $y$ is set to a desired reference level by selecting the resistors 172, 174. In this manner, a high voltage appears at the output N when the concentration of alcohol is lower than a predetermined value. Resistors 166 and 168 are arranged as shown.

The solenoid assembly 20 and the position detector switch 24 are described below in conjunction with the circuit arrangement of FIG. 2. A solenoid coil 184, which when energized actuates the solenoid assembly 20, is connected to the ignition switch 102 through a delay circuit 180 and a switch 182. The switch 182 is closed when a relay coil 230 is deenergized as will be later discussed. The provision of the delay circuit 180 is for the following purpose: As described, it takes a certain length of time to heat the sensing element 162 of the alcohol sensor 160 to an operating level. If the solenoid coil 184 is energized as soon as the ignition switch 102 is closed, the alcohol sensor 160 could not yield an accurate value of the alcohol concentration of the operator's breath. In order to avoid this inaccuracy, the delay circuit 180 is designed to energize the solenoid coil 184 if the switch 182 is closed at a predetermined time after closure of the ignition switch 102.

The position detector switch 24 is designed to be closed at a stored or intermediate position of the sensor body 10 and open upon withdrawal thereof.

A delay circuit 190 is provided in connection with the switch 24. At the output of the delay circuit 190, a high voltage fourth signal is produced when the switch 24 is closed. The high voltage continues to appear for a predetermined time after the switch 24 is opened. After that predetermined time, the circuit 190 produces a low voltage output, which continues for another predetermined length of time after the switch 24 is again closed. After this predetermined time has elapsed, a high voltage is again produced for the first predetermined time if the switch 24 is opened again. As will be described below, a high output voltage from the circuit 190 enables the operator to take a test. This arrangement prevents the operator from spending too long taking one test, or from taking another test immediately after failing one test. This is advantageous in that if the driver failed one test, he is given enough time to sober up before taking the next test.

It is possible to add to the circuit consisting of the switch 24 and the circuit 190 another arrangement wherein the period for which the driver is prevented from trying another test is prolonged in proportion to the concentration of alcohol in his breath, though not shown. This is accomplished by storing a value representing the concentration of alcohol in a memory circuit, and controlling the delay time of the delay circuit 190 in accordance with the stored value.

There is provided an AND circuit 200, one input of which is connected to the output of the AND circuit 126 while the other input is connected to the output of the AND circuit 156. This AND circuit 200 generates a high voltage at its output when high voltages are applied to both inputs, or when the temperature sensed by the element 112 and the humidity sensed by the element 136 are both within the predetermined ranges. The circuit 200 determines whether the breath sensed by the element 112 and the element 136 is that of a human being, and produces a high voltage output if such is the case. To the output of the AND circuit 200 is connected a delay circuit 202, the function of which will be described later.

Another AND circuit 210 is shown to have three inputs, one connected to the output of the delay circuit 190, another to the output of the delay circuit 202, and still another to the output of the comparator 176. The circuit 210 produces a high voltage at its output only if the voltages at all of its inputs are high. This is the case where, within the certain period of time after opening the position detector switch 24, the temperature and humidity sensors 110 and 130 sense human breath impinging on the element 112 and the element 136, and that the concentration of alcohol in the breath is lower than a predetermined level. In other words, the circuit 210 generates an output signal representing safety when the entire system as described has determined that the tested operator is not in a drunken condition. It may be noted that, if a possible lag in operation of the alcohol sensor 160 is greater than that of the temperature and humidity sensors 110 and 130, the circuit 210 will generate a safety signal, although the concentration of alcohol might exceed the predetermined level. The delay circuit 202 is provided so that the sensing of temperature and humidity concurs with the sensing of alcohol or is slightly after the latter.

The circuit consisting of elements 212, 214, and 216 is arranged and operates as follows: Connected to the output of the AND circuit 210 is an OR circuit 212 which produces a high voltage output when either of its two input voltages is high. The numerals 214 and 216 designate respectively an amplifier and a delay circuit. The delay circuit 216 generates a high output voltage as soon as a high voltage is applied to its input, which remains high for a predetermined length of time after the input voltage is changed to a low level. The delay circuit 216 is operable even if the ignition switch 102 is open and a supply of power to the sensors is interrupted.

The relay coil 230 already mentioned is energized when a high output voltage from the OR circuit 212 is fed through the amplifier 214 to the relay coil 230. The delay circuit 216 produces a high output voltage as soon as the amplifier 214 produces a high output voltage as already mentioned. Consequently, as long as a high voltage appears at the output of the AND circuit 210, the relay coil 230 is kept energized. Once the ignition switch 102 is opened, the input voltage to the delay circuit 216 drops to a low level. However, the delay circuit 216 is so arranged that its output voltage does not drop immediately upon opening of the ignition switch 102, but stays at a high level for a certain period thereafter, as already described. By virtue of this arrangement, the relay coil 230 remains energized for the certain period of time after the ignition switch 102 is opened. The purpose of this arrangement is to allow the operator to open the ignition switch 102, and reclose it within the certain period without having to take another test.

In parallel with the relay coil 230 is a lamp 234 indicating the driver's success in passing the test according to the present invention, indicating that he is sober.

Indicated as 220 is a switch operable by the relay coil 230, which is closed upon energization of the latter. In parallel connection with the switch 220 is an additional switch 222 which is operatively mounted on a power transmission of a vehicle and is designed to close only at a PARK or NEUTRAL position of the power transmission. A conductor 232 is shown to supply power from the battery 100 to an ignition device and an engine starter (not shown). As long as the transmission is held at a PARK or NEUTRAL position to render the switch 222 closed, the operator is permitted to start and warm up the engine without taking the test. However, it is impossible to drive the vehicle unless he passes the test according to the present invention resulting in the switch 220 being closed, because the engine is shut off if the transmission is shifted to a driving position, opening the switch 222. This arrangement is beneficial particularly to a driver in cold weather in that even in a drunken condition, he is able to warm himself by operating a heater driven from a running engine until he sobers up.

There are several alternatives for the above described arrangement within the scope of the present invention, in which the engine is prevented from running as long as the vehicle is in a drivable condition while permitting the engine to start in an undrivable condition of the vehicle, such that the engine is shut off as soon as a parking lock is released, the transmission is kept locked at PARK or NEUTRAL unless the driver passes the test, the engine is shut off as soon as the driver attempts to operate the steering device, the engine is shut off when the driver engages a clutch, or the engine is shut off upon movement of vehicle wheels.

It is readily seen that if the switch 222 is omitted, both starting the engine and driving the vehicle are inhibited unless the driver passed the test according to the present invention. It is also possible to omit the switch 220 and provide an alarm which signals when a driver tries to drive the vehicle without having passed the test.

In addition to the sensors of temperature, humidity and alcohol, a wind speed sensor may be included in the housing 12 of FIG. 1. The wind speed sensor is designed to produce a high voltage output if the driver blows against the housing 12 with a force within a certain range normal to human beings.

What is claimed is:

1. A system to prevent drunken driving of an engine driven vehicle having an engine starting system including an ignition switch and a power transmission, comprising a sensing assembly mounted on a part of the vehicle and normally held in a stored position and manually movable to an intermediate and a withdrawn position, said sensing assembly including a temperature sensor to sense the temperature of the driver's breath exhaled against said temperature sensor at said withdrawn position to produce a first signal when the sensed temperature lies within a predetermined range, a humidity sensor to sense the humidity of the driver's breath to produce a second signal when the sensed humidity lies within another predetermined range, and an alcohol sensor to sense the concentration of alcohol in the driver's breath to produce a third signal when the sensed concentration of alcohol is below a predetermined value; and means for actuating said engine starting system when the first, second and third signals are present.

2. A system as claimed in claim 1, wherein said temperature sensor comprises a sensing element for producing a voltage proportional to the temperature, first means for comparing said voltage proportional to temperature with a first reference voltage to produce a first output when said voltage proportional to temperature is lower than said first reference voltage, second means for comparing said voltage proportional to temperature with a second reference voltage to produce a second output when said voltage proportional to temperature is higher than said second reference voltage, and means for producing said first signal when said first and second outputs are both simultaneously supplied to its inputs.

3. A system as claimed in claim 1, wherein said humidity sensor comprises a sensing element for producing a voltage proportional to the humidity, first means for comparing said voltage proportional to humidity with a first reference voltage to produce a first output when said voltage proportional to humidity is lower than said first reference voltage, second means for comparing said voltage proportional to humidity with a second reference voltage to produce a second output when said voltage is higher than said second reference voltage, and means for producing said second signal when said first and second outputs are both simultaneously supplied to its inputs.

4. A system as claimed in claim 3, wherein said humidity sensing element comprises a hygroscopic layer coated on an insulating material, the electrical conductivity of said layer varying with the sensed humidity.

5. A system as claimed in claim 1, wherein said alcohol sensor comprises a sensing element for producing a voltage proportional to the concentration of alcohol, means for comparing said voltage proportional to the concentration of alcohol with a reference voltage to produce said third signal when said voltage proportional to the concentration of alcohol is lower than said reference voltage.

6. A system as claimed in claim 5, wherein said alcohol sensing element comprises a strip of semiconductive metal dioxide which is alcohol-absorptive and the resistance of which drops with the absorbed alcohol at a certain temperature thereof, and means for heating said strip to said certain temperature.

7. A system as claimed in claim 1, further comprising means for delaying the supply of said first and second signals for a predetermined time after the production of said signals respectively at the temperature sensor and humidity sensor.

8. A system as claimed in claim 1, further comprising means for detecting the position of said sensing assembly to produce a fourth signal when said sensing assembly is in said stored and intermediate positions and to produce a low voltage signal when said sensing assembly is in said withdrawn position.

9. A system as claimed in claim 8, wherein said fourth signal continues for a predetermined time after said sensing assembly has moved to said withdrawn position and said low voltage signal continues for another predetermined time after said sensing assembly has moved to said stored and intermediate positions.

10. A system as claimed in claim 8, wherein said means for actuating said engine starting system comprises a logic "AND" circuit producing an output voltage signal when said first, second, third and fourth signals are all simultaneously supplied to its inputs, means for amplifying said output voltage signal, a relay coil energizable in response to said amplified voltage, and a switch connected to said engine starting system and closing in response to the energization of said relay coil.

11. A system as claimed in claim 10, further comprising means for producing another voltage signal when said voltage signal is present at said "AND" circuit which continues for a predetermined time after said output voltage signal at said "AND" circuit disappears, and an "OR" circuit interposed between said "AND" circuit and said amplifying means for producing a further voltage signal when one of said voltage signal at said "AND" circuit and said another voltage signal at said means is supplied to its input.

12. A system as claimed in claim 10, further comprising indicating means actuable in response to said amplified voltage for indicating that said first, second, third and fourth signals are all present.

13. A system as claimed in claim 10, further comprising a solenoid assembly provided in said sensing assembly for locking said sensing assembly in said stored position and solenoid actuating means operable in response to deenergization of said relay coil for actuating said solenoid assembly, said solenoid assembly, when actuated, releasing said sensing assembly from said stored position to be manually movable to said intermediate and withdrawn positions.

14. A system as claimed in claim 13, further comprising means for delaying the actuation of said solenoid assembly for a predetermined time after said ignition switch is closed.

15. A system as claimed in claim 1, further comprising another means for actuating said engine starting system as long as the vehicle is in an undrivable condition.

16. A system as claimed in claim 15, wherein said another means for actuating said engine starting system comprises a transmission switch provided within said power transmission and connected to said engine starting system, said switch closing when said power transmission is in parking and neutral positions.

* * * * *